United States Patent [19]

Kerihuel et al.

[11] Patent Number: 5,303,285
[45] Date of Patent: Apr. 12, 1994

[54] WIRELESS TELEPHONE SERVICE ACCESS METHOD

[75] Inventors: Jean-Bernard Kerihuel; Maurice Martin, both of Paris, France

[73] Assignee: Alcatel N.V., Amsterdam, Netherlands

[21] Appl. No.: 2,100

[22] Filed: Jan. 8, 1993

Related U.S. Application Data

[63] Continuation of Ser. No. 706,969, May 29, 1991, abandoned.

[30] Foreign Application Priority Data

May 30, 1990 [FR] France ............................ 90 06705

[51] Int. Cl.$^5$ ............................................. H04M 11/00
[52] U.S. Cl. ........................................ 379/58; 379/62; 379/114; 370/110.1
[58] Field of Search ............... 379/58, 59, 60, 63, 379/91, 93, 111–114, 207, 230, 62, 132, 133, 140; 455/33.1, 33.2; 370/110.1

[56] References Cited

U.S. PATENT DOCUMENTS

| | | | |
|---|---|---|---|
| 4,592,045 | 5/1986 | Fundneider | 370/110.1 |
| 5,040,177 | 8/1991 | Martin et al. | 370/110.1 |

FOREIGN PATENT DOCUMENTS

| | | |
|---|---|---|
| 0264023 | 4/1988 | European Pat. Off. |
| 0367361 | 5/1990 | European Pat. Off. |

OTHER PUBLICATIONS

M. Ballard et al., "Cellular Mobile Radio as an . . . ", Electrical Communication, Brussels, BE, vol. 63, No. 4, 1989, pp. 389–399.
J. Dunogue et al., "Du Concept A L'Application Du Reseau . . . ", Commutation & Transmission, Paris, FR, No. 2, 1989, pp. 5–22.
W. Weiss et al., "System 900: The ISDN Approach to Cellular . . . ", Electrical Comm. Brussels, BE, vol. 63, No. 4, 1989, pp. 400–408.
Commutation a Transmission Article: "The Building of Intelligent Networks Architecture and Systems from Alcatel", No. 2, 1989, pp. 5–22.
Electrical Commonication Article "ISDN and Intelligent Network Based Teleport Service", vol. 64, No. 1, 1990.
Electrical Communication Article "Advanced VLSI Components for Digital Cellular Mobile Radio", vol. 63, No. 4, 1989, pp. 409–414.
British Telecommunications Engineering, "Telecommunications Today and Tomorrow: Trends and Opportunities", vol. 9, Aug. 1990.
Electrical Communication Article: "Cellular Mobile Radio as an Intelligent Network Application", vol. 63, Nov. 4, 1989, pp. 389–399.
European Transactions on Telecommunications and Related Technologies Article "Digtal Cellular Mobile-Radio System ECR900" Vol. 1, No. 1, Jan.-/Feb. 1990, pp. 17–30.

*Primary Examiner*—Wing F. Chan
*Assistant Examiner*—Dwayne D. Bost
*Attorney, Agent, or Firm*—Robbins, Berliner & Carson

[57] ABSTRACT

In a wireless telephone service access method a caller is authenticated by: storing and keeping up to date in service control point databases words identifying each subscription and the corresponding telephone and a secret key; transmitting from the caller's telephone to a service control point words identifying the subscription and the caller's telephone; determining in the caller's telephone a first signature using the secret key and a random number; transmitting the first signature to said service control point over the user to user signaling channel; determining in said service control point a second signature using the secret key and said random number; verifying in said service control point that: the first and second signatures are identical; the word identifying the caller's subscription represents a valid subscription; and the word identifying the caller's subscription matches the word identifying the caller's telephone.

5 Claims, 3 Drawing Sheets

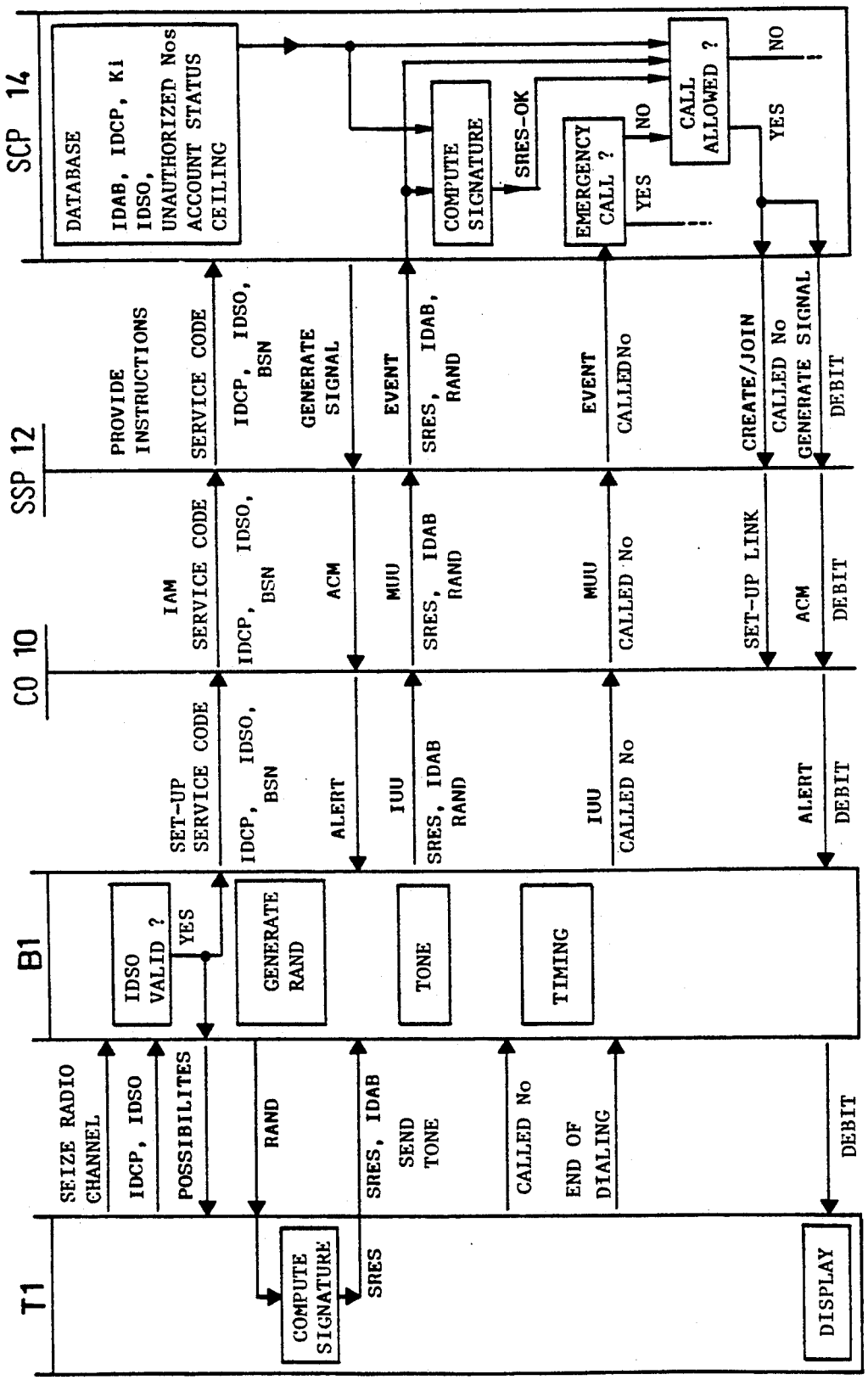

WIRELESS TELEPHONE SERVICE ACCESS METHOD

This is a continuation of application Ser. No. 07/706,969, filed May 29, 1991, now abandoned.

BACKGROUND OF THE INVENTION

1. Field of the Invention

The invention concerns a wireless telephone service access method, the service being provided by a network essentially comprising: fixed stations; wireless digital telephones linked by radio to the fixed stations; and an integrated services digital public switched telephone network. The invention is more particularly concerned with a wireless telephone service provided by an "intelligent" network to be described later.

2. Description of the Prior Art

A conventional wireless telephone service access method has two functions: to verify that the calling party is entitled to use the telephone that he is using; and to verify that the telephone is covered by a valid subscription including the entitlement to use the wireless telephone service. For the first of these checks the caller enters a confidential code (or personal identification number PIN) using the telephone keypad. This is compared with the code stored in the telephone to enable the telephone if they are identical. The second verification, or caller authentication, is more difficult as the subscriber characteristics of all service subscribers constitute a large volume of information which is constantly changing. In particular, a subscription is anulled if a telephone is lost or stolen.

In a known wireless telephone service access method the caller is authenticated by transmitting from the telephone to the fixed station a number identifying the subscriber. Each fixed station has its own authentication system which includes a blacklist of anulled subscriptions. Each fixed station is connected to the public switched telephone network by telephone channels only. Data for updating the blacklist is transmitted over these telephone channels during off-peak times using a modem.

This authentication method is not particularly secure, as the blacklist is updated only once a day in the best possible case; and also because the subscription number can be intercepted by a third party during the radio transmission.

What is more, this known method makes no provision for offering different types of subscription including authorization or rejection of access on the basis of the called number or on the basis of the subscriber account debit. Nor does it have any provision for transmitting to the caller's telephone a message to indicate the account debit on a display in the telephone. These are serious drawbacks with respect to the renting out of wireless telephones as the renter cannot restrict the rights provided by a subscription, to protect himself against unpaid bills, by barring certain numbers or by setting a ceiling on the subscriber account debit; and also because it is not feasible to apply a ceiling to a renter account debit without the renter being advised of the account status before each call.

An object of the invention is to propose an access method which offers increased protection against fraudulent misuse and which also makes provision for: selective authorization of certain numbers; sending to the caller's telephone a message indicating the account debit; and selectively authorizing a call according to the subscriber account status. This object is achieved by using an intelligent network structure for the wireless telephone network and by implementing the access method as will now be defined.

SUMMARY OF THE INVENTION

The invention consists in a wireless telephone service access method for a service provided by a network comprising:

a distribution network comprising fixed stations and wireless digital telephones linked by radio to the fixed stations;

an integrated digital services public switched telephone network to which each fixed station is connected by standard ports including a user to user signaling channel;

service control points connected to the public switched telephone network and each including a wireless telephone service subscriber database and a call processing logic device;

a service management system including a reference database;

which method consists in exchanging information between a fixed station and a service control point or the service management system to determine the right of access of a caller to the user to user signaling channel of the standard port connecting the fixed station to the public switched telephone network.

This access method is such that access can be authorized on the basis of information that is reliable because it is updated in real time at the integrated services public switched telephone network service control points. The bit rate of the user to user signaling channel is high enough to enable information to be exchanged in order to determine the caller's access right without incurring any additional cost because it is systematically present in each standard access to the integrated services digital public network.

In a preferred method in accordance with the invention to authenticate a caller consists in:

storing and keeping up to date in the service control point databases words identifying each subscription and the corresponding telephone and a secret key associated with said subscription and known to only one subscriber;

transmitting from the caller's telephone to the service control point serving the caller over the user to user signaling channel words identifying the subscription and the caller's telephone;

determining in the caller's telephone a first signature using the secret key known only to the caller and a random number, by means of a predetermined algorithm;

transmitting the first signature to said service control point over the user to user signaling channel;

determining in said service control point a second signature using the secret key associated with the caller's subscription and said random number by means of said predetermined algorithm;

verifying in said service control point that:

the first and second signatures are identical;

the word identifying the caller's subscription represents a valid subscription; and the word identifying the caller's subscription matches the word identifying the caller's telephone.

This access method means that the caller authentication is particularly reliable given that there is no transmission of secret data between the telephone and the network service control point, so that fraudulent interception of authentication data is prevented. Furthermore, any subscription can be anulled virtually instantaneously, as the centralized storage of data enables updating of service control point databases in real time.

A preferred method in accordance with the invention, to authorize access to a called party number, storing and keeping up to date in the service control point and service management system databases, for each subscription, data on the numbers authorized by said subscription and, for each access request:

verifying whether the called party number is an emergency service number; and verifying if the called party number is authorized by the caller's subscription if it is not an emergency service number.

This access method enables different types of subscription to be offered to the public, with access to the wireless telephone service barred if the number called does not match the type of subscription.

A preferred method in accordance with the invention to authorize access to a called number consists in:

storing and keeping up to date in the service control point and service management system databases, for each subscription, the subscription telephone charging account status and a predetermined maximum debit or ceiling authorized for the account of said subscription;

verifying if the called party number is an emergency service number; and verifying in said service control point whether the caller's subscription account status has reached said ceiling if the called party number is not an emergency service number.

This method enables the service provider to offer the public different types of subscription with different debit ceiling values, the ceiling value being possibly payable in advance by the subscriber.

A preferred method in accordance with the invention further consists in:

sending from the service control point servicing the caller to the telephone of the caller a message indicating his subscription telephone charging account status at the time access to the service is requested; and displaying this status on a display on the caller's telephone This method makes it possible to advise the subscriber of the amount by which his charging account can be debited so that the subscriber is not unexpectedly deprived of the right to use his telephone.

In one preferred method in accordance with the invention, to determine the first and second signatures, said random number is generated in the service control point and transmitted to the caller's telephone via the user to user signaling channel.

In one preferred method in accordance with the invention, to determine the first and second signatures, said random number is generated in the fixed station servicing the caller and transmitted to said service control point via the user to user signaling channel.

The invention will be better understood and further details of the invention will emerge more clearly from the following description given by way of non-limiting example only with reference to the appended diagrammatic drawings.

BRIEF DESCRIPTION OF THE DRAWINGS

FIG. 3 is another timing diagram showing a variation on this implementation example.

DETAILED DESCRIPTION OF THE INVENTION

Figure 1:
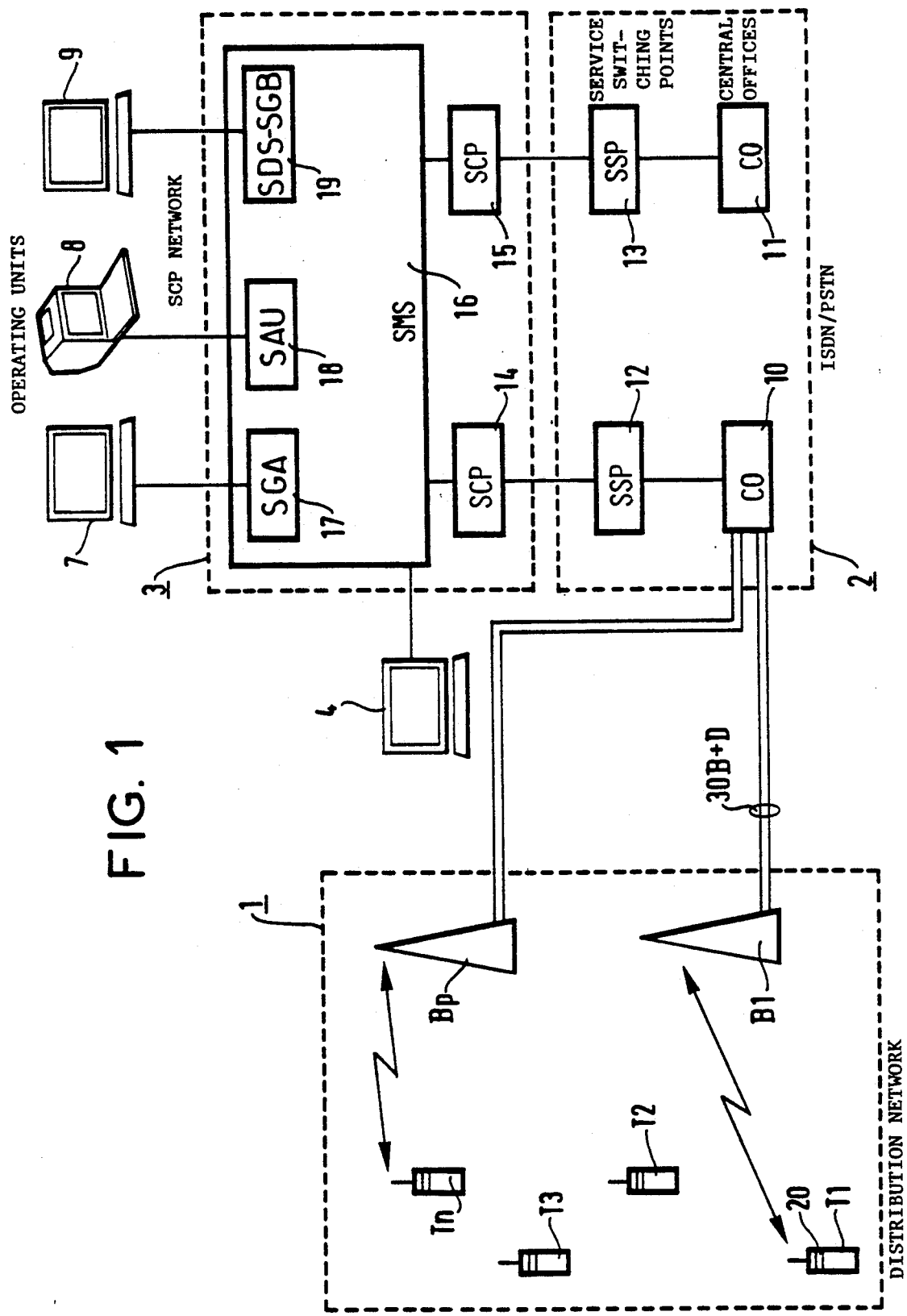
FIG. 1 is a block diagram of an intelligent network providing a wireless telephone service using an access method in accordance with the invention.

FIG. 1 is a block diagram of one example of an intelligent wireless telephone network in which a method in accordance with the invention is implemented. It comprises: a distribution network 1; an integrated services digital public switched telephone network 2; a service control point network 3; and administration units 4, 7, 8 and 9.

The distribution network 1 comprises portable wireless digital telephones T1 through Tn and fixed stations B1 through Bp. In this example each mobile telephone is required to remain in the vicinity of the same fixed station throughout the duration of a call but the invention is equally applicable to a network enabling call handover from one fixed station to another adjacent fixed station to enable the mobile telephone to move around during a call.

In this example each telephone T1 through Tn incorporates an alphanumeric display 20. Each telephone can be linked by radio to a nearby fixed station. Each fixed station B1 through Bp can service several telephones at the same time and is connected by standard ports to the public switched telephone network 2. Each standardized port to the network 2 provides a user to user signaling channel D and a number of telephone channels B. The number of telephone channels can be two for a base rate access port or 30 for a primary rate access port. These bidirectional telephone channels are switched in circuit mode. The bidirectional user to user signaling channel is switched in message mode. It is used to transmit data in parallel with telephone. A conventional application of this kind is to transmit the telephone number or the caller's name to a display on the called person's telephone terminal.

The public switched telephone network 2 is made up of central offices (CO) and service switching centers (SSP). In this example the network comprises two central offices 10 and 11 connected to respective service switching centers 12 and 13 by CCITT No 7 signaling links The fixed stations B1 through Bp are connected to the central office 10.

In this example the service control point network 3 comprises two service control points (SCP) 14 and 15 and a service management system (SMS) 16. The network service control points 14 and 15 are connected to the respective service switching centers 12 and 13 by CCITT No 7 signaling links and to the service management system 16 by CCITT X.25 links.

Each operating unit 4, 7, 8 and 9 essentially comprises a screen-keyboard terminal. The terminals are assigned to different administration teams, the service management system 16 providing information and dialogue resources for each team. The terminal 4 is assigned to the intelligent network technical operator. The terminal 9 is an ASCII or videotex terminal assigned to a technical operator of the set of fixed stations or of a particular subset of fixed stations. It accesses the database of the service management system 16 via a fixed station management server (SGB) and a statistics server (SDS) combined in a single unit 19. The optional terminal 8 is a videotex terminal enabling a subscriber to consult service data: subscription data and billing tickets. It accesses the service management system 16 via a user access server (SAU) 18. The terminal 7 is a videotex terminal assigned to the wireless telephone service sales operator. It accesses the service management system 16 via a subscriber management server (SGA) 17 which is also connected to the subscriber management system 16.

Each fixed station B1 through Bp includes a controller which supervises B telephone channel interfaces, D signaling channel interfaces and radio channel interfaces. This controller has the following functions:

initiation of a call to the network when a radio channel is seized by a telephone T1 through Tn;

contributing to the caller authentication procedure;

analyzing information received on the radio channels;

supervising the radio channels;

carrying out an internal self-test procedure in connection with fixed station maintenance;

downloading modifications to the fixed station software;

measurements (counts and statistics);

radio channel synchronization.

A call for service from a public network 2 user is analyzed in the service switching center 12 or 13 and then passed to the respective service control point 14 or 15. The service control point then controls call processing and the service switching center in respect of all actions requiring switching resources: for example: to send a recorded announcement, or to set up a connection between a network input and a network output, or to introduce a time-delay. Service control point software for each service organized as a string of basic actions processes each call on the basis of messages received. It also has access in real time to a database.

The service management system 16 is not involved in call processing. However, it contains in a database the service software and the subscriber data and therefore constitutes a reference source for the service. It handles technical administration of the network of service control points 14 and 15, in particular to maintain database consistency; it also handles commercial administration of the service: contract management, operator access, subscriber access.

The service control points 14 and 15 and the service management system 16 may be in the form of an LCA-TEL8300 multiprocessor marketed by the ALCATEL company, for example.

The service control points 14 and 15 implement the wireless telephone service access method. Each includes a wireless telephone service subscriber database containing data relating to some or all service subscribers. This database is updated by the service management system 16 and all the databases of the service control points 14 and 15 are updated simultaneously, immediately the service management system 16 is advised of any modification relating to the subscribers by one of the administration centers 4, 7, 8 or 9.

The database of the service control points 14 and 15 and the service management system 16 includes the following data on each subscriber:

a subscription identification word IDAB;

a telephone identification word IDCP;

a secret key Ki specific to the subscriber;

a subscription service and service operator identification word IDSO;

the type of subscription: international, enabling all calls without restriction; or national, authorizing calls in a single country; or selective, authorizing calls to numbers in a predefined list;

the numbers the subscriber is authorized to access, in the case of a selective type subscription;

the account debit ceiling, the expiry date of the subscription.

Figure 2:
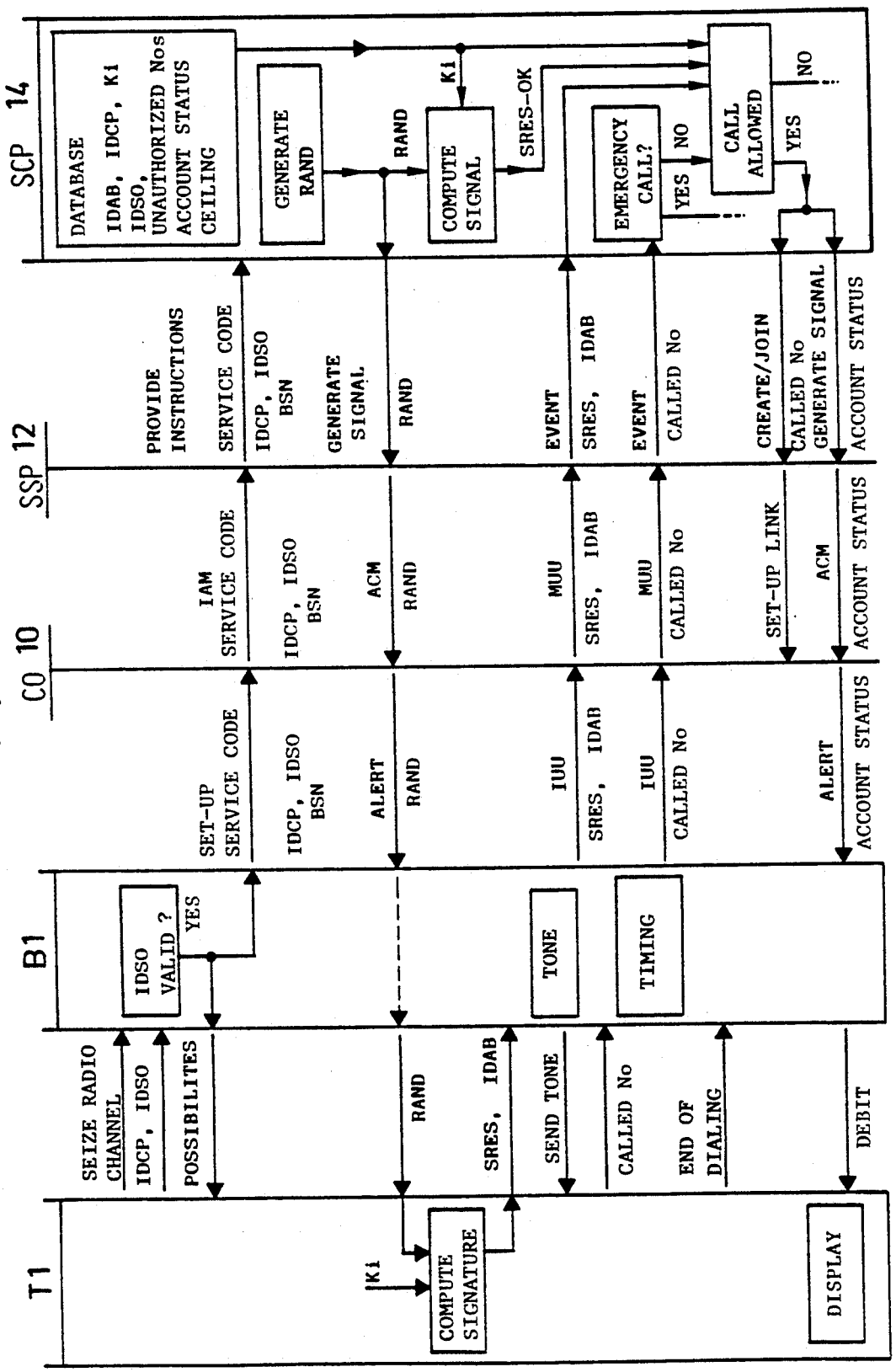
FIG. 2 is a timing diagram showing one example of implementation of the method in accordance with the invention.

FIG. 2 is a timing diagram showing the information exchanged when a caller accesses the wireless telephone service. The time axis runs from the top to the bottom of the figure. First the caller enables his telephone T1 by entering his confidential code on the telephone keypad. The code is verified by the telephone itself. Enabling of the telephone is followed by the seizure of a radio channel of a nearby fixed station B1, using a standard, conventional procedure.

The telephone T1 then transmits two words IDCP and IDSO to the fixed station B1. The word IDSO designates the wireless telephone service and its operator. The word IDCP designates the telephone T1. The fixed station B1 verifies that the word IDSO designates a known operator and then sends to the telephone T1 a message to indicate that it can access the requested service.

At the same time the fixed station B1 sends to the central office 10 a SET-UP message complying with the No 7 protocol and including a field reserved for user to user signaling. This field contains a code word designating the requested service, in other words the wireless telephone service; the words IDCP and IDSO; and a word (number) BSN designating the fixed station B1. The central office 10 sends a message IAM containing the same words to the service switching center 12. The latter sends to the service control point 14 a PROVIDE INSTRUCTIONS message containing the same words.

The service control point 14 then generates a random number RAND and sends it to the mobile service switching service 12 in a GENERATE SIGNAL message, in the field reserved for user to user signaling. The service switching center 12 sends a message ACM to the central office 10 containing the random number RAND. The central office 10 forwards the random number RAND to the fixed station B1 in an ALERT MESSAGE. The fixed station B1 forwards the random number RAND to the telephone T1 which uses it to calculate a signature SRES using a secret key Ki stored in the telephone T1 and known to one subscriber only. The signature is calculated using a conventional encryption algorithm.

The key Ki is stored in a protected module which plugs into the telephone T1 to customize it for a particular subscriber. This plug-in module also contains the word IDAB which designates the subscriber independently of the word IDCP which designates the telephone T1 into which the module is plugged. The telephone T1 sends to the fixed station B1 the word SRES constituting its signature and the word IDAB. The fixed station B1 then sends to the telephone T1 a tone inviting the caller to dial the called party number.

The fixed station B1 transmits the words SRES and IDAB to the central office 10 in a message IUU. The central office 10 forwards them to the service switching center 12 in a message MUU. The service switching center 12 forwards them to the service control point 14 in a message EVENT.

The caller enters the called party number. The fixed station B1 introduces the usual time-delays between the digits of the number. The caller ends input of the number with an end of dialing signal which triggers sending of the called party number from the fixed station B1 to the central office 10 in a message IUU. The central office 10 forwards the called party number to the service switching center 12 in a message MUU. The service switching center 12 forwards the called party number to the service control point 14 in a message EVENT.

If the called number is that of an emergency service (fire, police, ambulance) the call is authorized without any authentication. To simplify the diagram the remainder of any such call is not shown. The service management system 16 generates a call ticket immediately, sends a set-up instruction to the service switching center 12 and then releases the call. The fixed station B1 then handles routing of the call to the central office 10. The call is therefore routed on the basis of the geographical position of the fixed station which received the call.

If the number is not that of an emergency service the service control point 14 must authenticate the caller and verify that the caller is authorized to access the called party number.

The service control point 14 determines a reference signature SRES-OK on the basis of the random number RAND and the secret key Ki for the subscription designated by the word IDAB, reading this word in its database. The algorithm used for this is the same as the algorithm used in the telephone T1. It depends on the service operator, as determined from the word IDSO sent by the telephone T1.

The service control point 14 checks what it receives from the network against the content of its database in several ways. It verifies that the signal SRES is identical to the reference signal SRES-OK to identify any fraudulent misuse of the words IDAB and IDCP of a subscriber as a result of intercepting them. It verifies that the word IDAB identifying the subscription represents a valid subscription. It verifies the word IDAB matches the word IDCP identifying the telephone T1, to identify a stolen telephone.

The service control point 14 also verifies that the called party number is one that the caller is authorized to access, by comparing the called party number with the authorized numbers stored in the database as part of the data relating to the subscriber concerned.

Finally, it verifies that the caller's account has not yet reached the ceiling set by the subscription. To enable this function to be exercized the database of the service control point 14 contains the subscriber charging debit amount updated in real time by the service management system 16.

If the result of any of the above checks is negative access is refused. To simplify the figure the remainder of the procedure in this case is not shown. The service control point 14 instructs the central office 10 to signal this refusal to the caller by means of a tone or recorded announcement. It can, after a predetermined number of attempts by the same caller have been refused, blacklist the subscription, after which it causes the link to be released.

If the results of all the above checks are positive, the service control point 14 sends to the service switching center 12 a message CREATE/JOIN which includes the called party number. The service switching center 12 sends to the central office 10 an instruction to set up the link for this number.

In this example the service management system 16 carries out a further operation by sending to the caller's telephone T1 the status of his subscription telephone charging account immediately before the link to the called party number is set up. The service control point 14 sends this information to the service switching center 12 in a user to user signaling field of a message GENERATE SIGNAL. The service switching center 12 forwards the information to the central office 10 in a message ACM. The central office 10 forwards it to the fixed station B1 in a message ALERT. The fixed station B1 forwards it to the telephone T1 over the radio channel. The debit is displayed on the display 20 on the telephone T1.

FIG. 3 is a timing diagram showing one embodiment of a method in accordance with the invention which differs from the embodiment described above in that the random number RAND is generated in the fixed station of the calling party and transmitted from the fixed station B1 to the service control point 14 where it is used to calculate the reference signature. The messages GENERATE SIGNAL, ACM and ALERT returned by the fixed station B1 no longer contain the random number RAND; their only function is to transmit the instruction which initiates sending of the tone by the fixed station B1. On the other hand, the messages IUU, MUU and EVENT transmit from the fixed station B1 to the service control point 14 the random number RAND, the signature SRES and the word IDAB identifying the subscriber.

The checks carried out by the service control point 14 and the transmission of the subscriber account status information are unchanged.

There is claimed:

1. Wireless telephone service access method for a service provided by a network including a distribution network having a plurality of fixed stations and at least one wireless digital telephone linked by radio to a selected one of the fixed stations, an integrated digital services public switched telephone network to which each of the fixed stations is connected by standard ports including a signaling channel, at least one service control point connected to the public switched telephone network and having a wireless telephone service subscriber database and a call processing logic device, and at least one service management system having a reference database, which method comprises the steps:

exchanging, via said signaling channel, information between said selected fixed station and the service control point or the service management system;

determining from said information an access right of a caller desiring to access the public switched telephone network from said wireless digital telephone storing and keeping up to date in the service control point and service management system databases, for each subscription, the subscription telephone charging account status and a predetermined maximum debit or ceiling authorized for the account of said subscription;

verifying if the called party number is an emergency service number;

verifying in said service control point whether the caller's subscription account status has reached said ceiling if the called party number is not an emergency service number;

sending from the service control point servicing the caller to the telephone of the caller a message indicating his subscription telephone charging account status at the time access to the service is requested; and displaying this status on a display on the caller's telephone.

2. Method according to claim 1 further comprising, to authorize access to a called party number:

point and service management system databases, for each subscription, data on the numbers authorized by said subscription, and, for each access request:

verifying if the called party number is authorized by the caller's subscription if it is not an emergency service number.

3. Wireless telephone service access method for a service provided by a network including a distribution network having a plurality of fixed stations and at least one wireless digital telephone linked by radio to a selected one of the fixed stations, an integrated digital services public switched telephone network to which each of the fixed stations is connected by standard ports including a signaling channel, at least one service control point connected to the public switched telephone network and having a wireless telephone service subscriber database and a call processing logic device, and at least one service management system having a reference database, which method comprises the steps:

exchanging, via said signaling channel, information between said selected fixed station and the service control point or the service management system; and determining from said information an access right of a caller desiring to access the public switched telephone network from said wireless digital telephone;

storing and keeping up to date in the service control point databases, words identifying each subscription and the corresponding telephone and a secret key associated with said subscription and known to only one subscriber;

transmitting from the caller's telephone to the service control point serving the caller over the signaling channel words identifying the subscription and the caller's telephone;

determining in the caller's telephone a first signature using the secret key known only to the caller and a random number, by means of a predetermined algorithm;

transmitting the first signature to said service control point over the signaling channel;

determining in said service control point a second signature using the secret key associated with the caller's subscription and said random number by means of said predetermined algorithm; and verifying in said service control point that: the first identifying the caller's subscription represents a valid subscription; and the word identifying the caller's subscription matches the word identifying the caller's telephone;

wherein, to determine the first and second signatures, said random number is generated in the service control point and transmitted to the caller's telephone via the signaling channel.

4. Wireless telephone service access method for a service provided by a network including a distribution network having a plurality of fixed stations and at least one wireless digital telephone linked by radio to a selected one of the fixed stations, an integrated digital services public switched telephone network to which each of the fixed stations is connected by standard ports including a signaling channel, at least one service control point connected to the public switched telephone network and having a wireless telephone service subscriber database and a call processing logic device, and at least one service management system having a reference database, which method comprises the steps:

exchanging, via said signaling channel, information between said selected fixed station and the service control point or the service management system; and determining from said information an access right of a caller desiring to access the public switched telephone network from said wireless digital telephone;

storing and keeping up to date in the service control point databases, words identifying each subscription and the corresponding telephone and a secret key associated with said subscription and known to only one subscriber;

transmitting from the caller's telephone to the service control point serving the caller over the signaling channel words identifying the subscription and the caller's telephone;

determining in the caller's telephone a first signature using the secret key known only to the caller and a random number, by means of a predetermined algorithm;

transmitting the first signature to said service control point over the signaling channel;

determining in said service control point a second signature using the secret key associated with the caller's subscription and said random number by means of said predetermined algorithm; and verifying in said service control point that: the first and second signatures are identical; the word identifying the caller's subscription represents a valid subscription; and the word identifying the caller's subscription matches the word identifying the caller's telephone;

wherein, to determine the first and second signatures, said random number is generated in the fixed station servicing the caller and transmitted to said service control point via the signaling channel.

5. Wireless telephone service network comprising:

a distribution network including a plurality of fixed stations and a plurality of wireless digital telephones linked by radio to the fixed stations;

an integrated digital services public switched telephone network to which each fixed station is connected by standard ports including a signaling channel;

a service control point connected to the public switched telephone network, including a wireless telephone service subscriber database and a call processing logic device;

a service management system including a reference database;

information exchange means associated with each of the fixed stations for exchanging with said service control point or said service management system, via the signaling channel of the standard port connecting the fixed station to the public switched telephone network, information concerning a caller desiring to access the public switched telephone network from a particular said wireless digital telephone;

access means responsive to said information for determining to what extent said caller has a right to access the public switched telephone network from said particular wireless digital telephone;

means for storing and keeping up to data in the service control point and service management system databases, for each subscription, the subscription telephone charging account status and a predetermined maximum debit or ceiling authorized for the account of said subscription;

means for verifying if the called party number is an emergency service number;

means for verifying in said service control point whether the caller's subscription account status has reached said ceiling if the called party number is not an emergency service number;

means for sending from the service control point servicing the caller to said particular telephone of the caller a message indicating his subscription telephone charging account status at the time access to the service is requested; and means for displaying this status on a display on said particular wireless digital telephone.

* * * * *